United States Patent
Li et al.

(10) Patent No.: US 9,330,013 B2
(45) Date of Patent: May 3, 2016

(54) METHOD OF CLONING DATA IN A MEMORY FOR A VIRTUAL MACHINE, PRODUCT OF COMPUTER PROGRAMS AND COMPUTER SYSTEM THEREWITH

(75) Inventors: Han-Lin Li, Taoyuan County (TW); Jui-Hao Chiang, Hsinchu (TW); Tzi-Cker Chiueh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 405 days.

(21) Appl. No.: 13/535,360

(22) Filed: Jun. 28, 2012

(65) Prior Publication Data
US 2014/0006734 A1  Jan. 2, 2014

(51) Int. Cl.
| | | |
|---|---|---|
| G06F 12/10 | (2016.01) | |
| G06F 9/455 | (2006.01) | |
| G06F 21/53 | (2013.01) | |
| G06F 11/14 | (2006.01) | |

(52) U.S. Cl.
CPC ........ *G06F 12/1009* (2013.01); *G06F 9/45558* (2013.01); *G06F 21/53* (2013.01); *G06F 11/1484* (2013.01); *G06F 2009/45562* (2013.01); *G06F 2009/45583* (2013.01); *G06F 2212/151* (2013.01); *G06F 2212/651* (2013.01); *G06F 2221/2141* (2013.01); *G06F 2221/2145* (2013.01); *G06F 2221/2149* (2013.01)

(58) Field of Classification Search
CPC .............. G06F 9/45558; G06F 12/109; G06F 2212/151; G06F 2009/45583; G06F 12/121; G06F 12/122; G06F 12/123; G06F 12/1458; G06F 2009/45595
See application file for complete search history.

(56) References Cited

U.S. PATENT DOCUMENTS

| | | | |
|---|---|---|---|
| 5,761,678 A | 6/1998 | Bendert et al. | |
| 6,671,791 B1 * | 12/2003 | McGrath | ........................ 711/206 |
| 6,807,622 B1 * | 10/2004 | McGrath | ........................ 712/210 |
| 7,299,468 B2 | 11/2007 | Casey et al. | |

(Continued)

FOREIGN PATENT DOCUMENTS

| | | |
|---|---|---|
| TW | 201117100 | 5/2011 |
| TW | 201118738 | 6/2011 |

OTHER PUBLICATIONS

Warfield et al., "Parallax: Managing Storage for a Million Machines", In proceedings of the 10th USENIX Workshop on Hot Topics in Operating Systems (HotOS-X), Jun. 2005, pp. 1~5.

(Continued)

*Primary Examiner* — Yong Choe
*Assistant Examiner* — Mohamed Gebril
(74) *Attorney, Agent, or Firm* — Jianq Chyun IP Office (57) ABSTRACT

A method of cloning data in a memory for a source virtual machine (VM) and at least one cloned virtual machine is proposed. A mapping relationship between a guest physical address from the source VM or the cloned VM and a host physical address of the memory is defined by a plurality of page tables configured in a plurality of hierarchical levels. In the method, metadata of the page tables in the highest level or the higher levels of the plurality of hierarchical levels is copied to the virtual machine. Remaining metadata of the page tables in the levels other than the highest level or the higher levels of the plurality of hierarchical levels is replicated to the virtual machine in response to the access operation. Data stored in the corresponding address of the memory is accessed according to the metadata and the replicated metadata.

24 Claims, 11 Drawing Sheets (56) References Cited

U.S. PATENT DOCUMENTS

| | | | |
|---|---|---|---|
| 7,343,603 B1* | 3/2008 | Fresko | 719/310 |
| 7,536,525 B2 | 5/2009 | Chandrasekaran et al. | |
| 7,693,878 B2 | 4/2010 | Anglin et al. | |
| 7,784,053 B2 | 8/2010 | Casey et al. | |
| 7,877,735 B2 | 1/2011 | Todorova et al. | |
| 7,941,470 B2 | 5/2011 | Le et al. | |
| 8,117,496 B2 | 2/2012 | Bashir et al. | |
| 8,151,263 B1* | 4/2012 | Venkitachalam et al. | 718/1 |
| 2005/0138623 A1* | 6/2005 | Fresko | 718/102 |
| 2005/0278338 A1 | 12/2005 | Todorova et al. | |
| 2006/0101189 A1 | 5/2006 | Chandrasekaran et al. | |
| 2006/0161719 A1* | 7/2006 | Bennett et al. | 711/6 |
| 2008/0244028 A1 | 10/2008 | Le et al. | |
| 2009/0013149 A1* | 1/2009 | Uhlig et al. | 711/207 |
| 2009/0216984 A1* | 8/2009 | Gainey et al. | 711/166 |
| 2010/0299667 A1* | 11/2010 | Ahmad et al. | 718/1 |
| 2010/0318762 A1* | 12/2010 | Malyugin et al. | 711/207 |
| 2012/0030406 A1 | 2/2012 | Chang et al. | |
| 2012/0030407 A1* | 2/2012 | Pandey et al. | 711/6 |
| 2013/0326110 A1* | 12/2013 | Tsirkin et al. | 711/6 |
| 2013/0326172 A1* | 12/2013 | Tsirkin et al. | 711/162 |
| 2014/0201421 A1* | 7/2014 | Schoenberg | 711/6 |

OTHER PUBLICATIONS

Sun et al., "Fast Live Cloning of Virtual Machine Based on Xen", 11th IEEE International Conference on High Performance Computing and Communications, Jun. 2009, p. 392-399.

Vrable et al., "Scalability, Fidelity, and Containment in the Potemkin Virtual Honeyfarm", ACM Symposium on Operating System Principles (SOSP), Oct. 2005, pp. 148~162, vol. 39, No. 5.

Dunlap et al., "ReVirt: Enabling Intrusion Analysis through Virtual-Machine Logging and Replay", Proceedings of the 2002 Symposium on Operating Systems Design and Implementation (OSDI), Dec. 2002, pp. 211~224.

Oliveira et al., "ExecRecorder: VM-Based Full-System Replay for Attack Analysis and System Recovery", Proceedings of the 1st workshop on Architectural and system support for improving software dependability (ASID '06), 2006, pp. 66~71.

Twigg et al., "Stratified B-trees and Versioned Dictionaries.", In Proceedings of the 3rd USENIX conference on Hot topics in storage and file systems (HotStorage'11), Nov. 1, 2011, pp. 1~5.

Ohad Rodeh, "B-trees, Shadowing, and Clones", ACM Transactions on Storage (TOS), Feb. 2008, pp. 1~26, vol. 3, No. 4.

"Office Action of Taiwan Counterpart Application", issued on Aug. 8, 2014, p. 1-p. 4.

James E. Smith, et al., "The Architecture of Virtual Machines," Computer, vol. 38, Issue 5, May 2005, pp. 32-38.

"Office Action of China Counterpart Application", issued on Sep. 7, 2015, p. 1-p. 9.

\* cited by examiner

METHOD OF CLONING DATA IN A MEMORY FOR A VIRTUAL MACHINE, PRODUCT OF COMPUTER PROGRAMS AND COMPUTER SYSTEM THEREWITH

BACKGROUND

1. Technical Field

The technical field relates to a method of cloning data in a memory for a source virtual machine (VM) and at least one cloned virtual machine.

2. Background

System virtualization is the abstraction and pooling of resources on a platform. This abstraction decouples software and hardware and enables multiple operating system images to run concurrently on a single physical platform without interfering with each other. Virtualization can increase utilization of computing resources by consolidating workloads running on many physical machines into virtual machines running on a single physical machine. This consolidation can dramatically reduce power consumption and floor space requirements in the data center. Virtual machines can be provisioned on-demand, replicated and migrated using a centralized management interface.

To allow multiple operating systems to run on the same physical platform, a platform layer implemented in software decouples the operating system from the underlying hardware. This layer is called the hypervisor or virtual machine monitor (VMM). In context of system virtualization, the operating system being virtualized is referred to as guest. To properly virtualize and isolate a guest, the hypervisor or virtual machine monitor (VMM) must control or mediate all privileged operations performed by the guest. The hypervisor can accomplish this using various techniques.

Rapid or almost real time cloning of a virtual machine (VM) plays a notable feature in a virtualization environment or a platform for system virtualization. The technique may be adaptive to load balancing, pre-deployment testing, speculative execution, data mining, and, in a large data center, virus scanning or malware analysis. When unknown software is loaded or is ready for execution, the execution of the unknown software may be intercepted or interrupted by an antivirus program or an agent, and rapid cloning of VM may be requested in advance. The cloned VM has the same operating environment and status with the parent or original VM. The agent may discretionarily execute the unknown software as well as perform virus scanning or malware analysis. Even the execution of the software may cause the VM being crashed or paralysed; the original VM will not be affected because the damage will occur in the cloned VM.

In conventional art, live migration technique is implemented for rapid or almost real time cloning of the VM. Live migration allows a server administrator to move a running virtual machine or application between different physical machines without disconnecting the client or application. For a successful live migration, the memory, storage, and network connectivity of the virtual machine needs to be migrated to the destination. However, the cloning of the VM begins after the completion of data migration for the memory, storage, or disk, which may not satisfy the requirement of rapid or almost real time cloning of the VM.

In conventional art, snapshot mechanism is proposed for fast cloning VM and initializing the cloned VM. However, the original VM is required to be shut off or in a quiesced state, which makes the cloning of VM in executing state being achieved. The snapshot mechanism is adaptive to rapidly clone a large number of virtual machines, but not support real time isolation environment for cloning.

In other conventional art, during performing a process of cloning a source VM, the way to copy the data stored in the physical memory may copy the whole metadata of the source VM to the target VM. The metadata (for example, page tables) in the target VM will be redirected to the memory of the source VM. The information stored in all pages of the memory pointed by two metadata will be marked "read only". Copy-on-write (COW) will be employed for access operations. However, in the page table directory (PTD) structure, the only way to set the page table entry (PTE) as read only is to traverse the whole page table, and change the read-flags of the total PTEs to be "read only". The time for such operation will be almost the same as the time to copy the whole page table. The required time for such operation will be increased if the capacity of the memory is increased as desired. If the capacity of the memory reaches several GB or more, the required time will be increased to over several seconds or more, which is not satisfied in the field.

SUMMARY

One of exemplary embodiments comprises a method of cloning data in a memory for a source virtual machine (VM) and at least one cloned virtual machine, wherein a mapping relationship between a guest physical address from the source VM or the cloned VM and a host physical address of the memory is defined by a plurality of page tables configured in a plurality of hierarchical levels. The method comprises copying metadata of the page tables in the highest level or the higher levels of the plurality of hierarchical levels to the virtual machine; replicating remaining metadata of the page tables in the levels other than the highest level or the higher levels of the plurality of hierarchical levels to the virtual machine in response to the access operation; and accessing data stored in the corresponding address of the memory according to the metadata and the replicated metadata.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The disclosure provides a fast cloning method of data stored in a memory of a virtual machine (VM). One of exemplary embodiments comprises providing a method of cloning metadata by copy-on-access (COA) and cloning data by copy-on-write (COW) for rapid cloning VM. Isolated protection and/or independent execution for different levels of VMs may be achieved and applied.

In one of exemplary embodiments, when the VM desires to accesses data, the copy-on-access (COA) technique is used to replicate remaining metadata in order to implement the access operation. The copy-on-write (COW) technique is used to replicate data stored in the corresponding address accessed in the physical memory if the source VM or the target VM writes data to the physical memory In context of system virtualization, a virtual address is the address a program uses to access data and instructions. The virtual address includes segment and offset fields. The segment information is used to determine protection information and starting address of segment. Operating systems generally use flat segmentation where all segments are mapped to the entire physical address space. Under flat segmentation the virtual address effectively becomes the linear address.

If paging is enabled, the linear address is translated to a physical address using processor paging hardware. To use paging, the operating system creates and manages a set of page tables. The address translation uses these page tables and various bit fields in the linear address. Please refer to FIG. 1A, which schematically shows a new page-table structure introduced herein. In context of system virtualization, the operating system being virtualized is referred to as a guest. To properly virtualize and isolate the guest, the hypervisor or virtual machine monitor (VMM) may control or mediate all privileged operations performed by the guest.

Figure 1A:
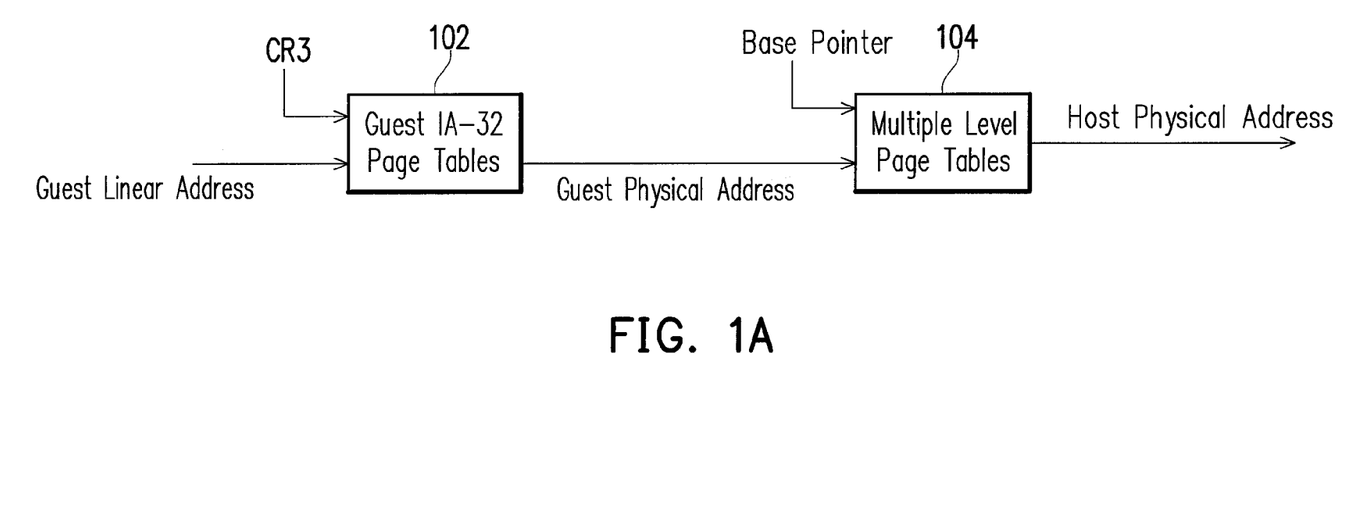
FIG. 1A schematically shows a new page-table structure in one of exemplary embodiments.

The new page-table structure, under control by a memory management hardware circuitry in the hypervisor or VMM, is used to define mapping between the guest physical address and host physical address. In the page-table structure, the guest has full control over its own IA-32 page tables 102. Under control of the guest, the guest linear address is mapped to a guest physical address by using control register 3 (CR3). In one embodiment, the CR3 is often referred to as the page directory base register (PDBR). The register contains the physical address of a page, which may be a page directory. If paging is turned on, and CR3 is set to an invalid or uninitialized page directory, the machine will most likely suffer an unrecoverable fault, since all memory references have just been yanked out from under it.

The guest physical address is then mapped to the host physical address under control of the memory management hardware circuitry by multiple level page tables 104 and a base pointer. The multiple level page tables 104 may be a B-tree like structure and have multiple levels for translating the guest address to the physical address. In the virtualization platform, some overheads are occurred from the virtualization of the CPU, the MMU (Memory Management Unit), and the I/O devices. Some of recent x86 processors such as AMD® and Intel® begin to provide hardware extensions to help bridge this performance gap. Both vendors introduce their first-generation hardware support for x86 virtualization with AMD-Virtualization™ (AMD-V™) and Intel® VT-x technologies. Intel introduces its hardware support that incorporates MMU virtualization, called Extended Page Tables (EPT). Either in the AMD-Virtualization™ (AMD-V™) technology or in Intel® VT-x technology, or in other technologies, the hardware extensions is used to define mapping between the guest physical address and host physical address by four-level page tables, in one embodiment.

Figure 1B:
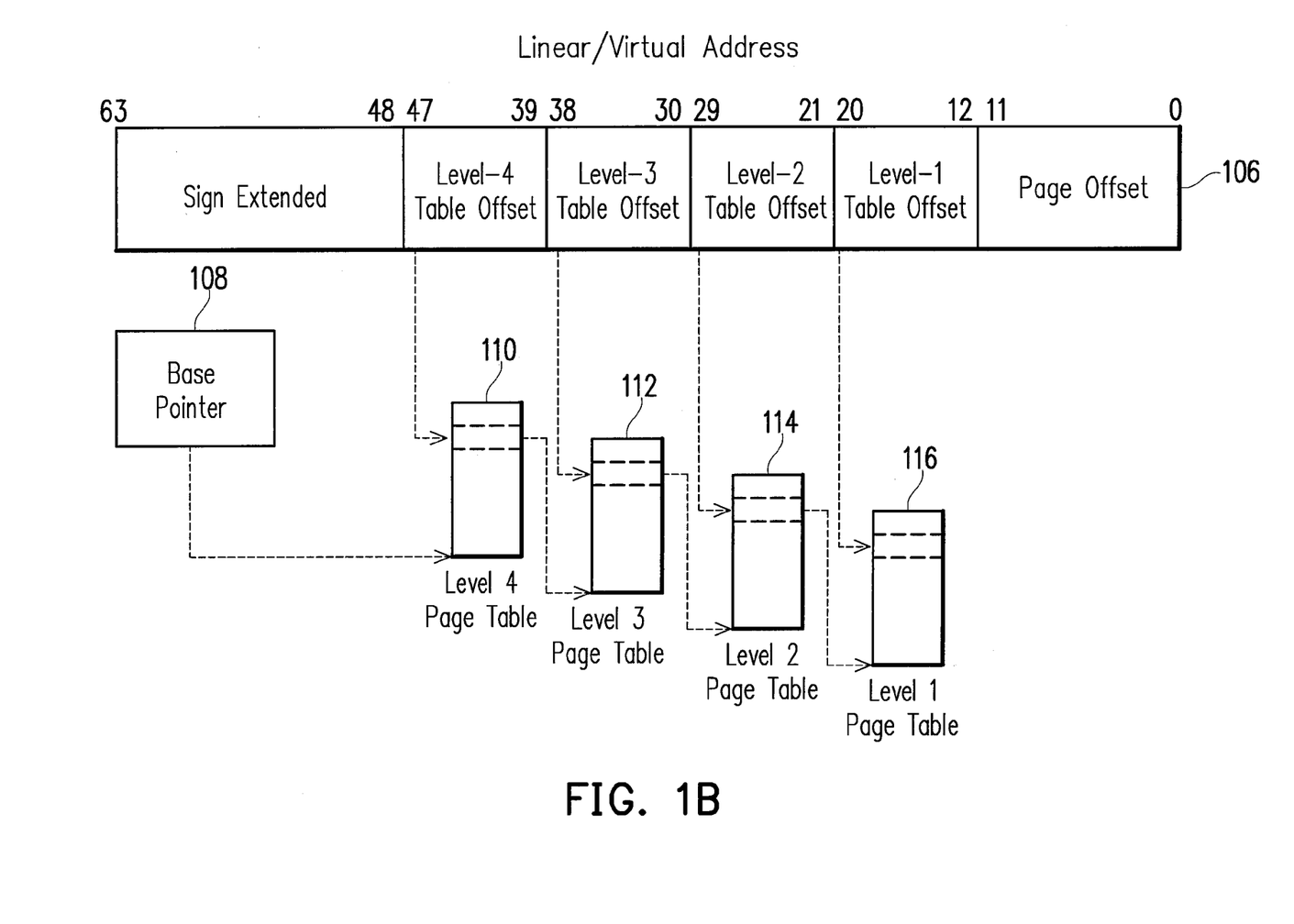
FIGS. 1B and 1C schematically illustrate one embodiment of mapping between the guest physical address and host physical address by four-level page tables.
Figure 1C:
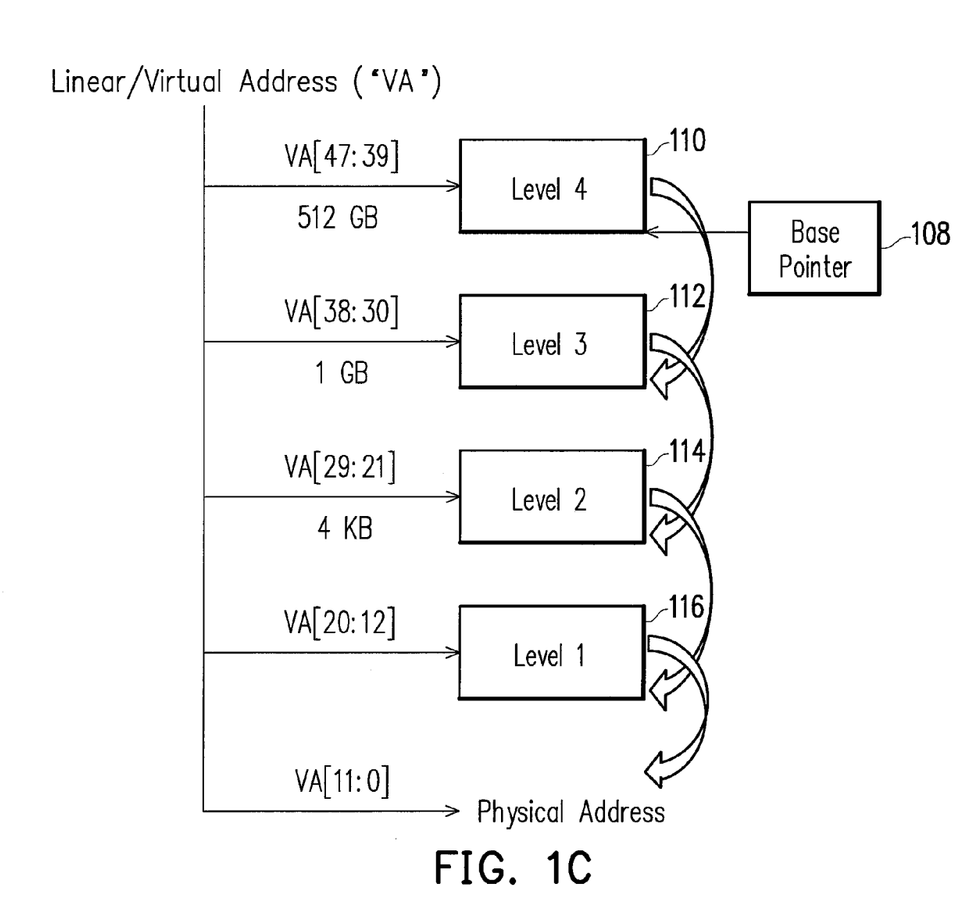

Please refer to FIGS. 1B and 1C, which illustrate one embodiment of mapping between the guest physical address and host physical address by page tables, in which the page tables are configured in a plurality of hierarchical levels, for example, arranged in four levels, but not limited thereto. In the embodiment of hierarchical storage management, the linear or virtual address 106 includes several segment fields and offset fields, for example, level-1~level-4 table offset fields from bit-12~bit-47 in the 64-bit address. If paging is enabled, the linear address 106 is translated to a physical address using processor paging hardware. To use paging, the operating system creates and manages a set of page tables such as level 4~level 1 page tables 110, 112, 114 and 116, as shown. A base pointer 108 is used in the address translation. In FIG. 1C, high level algorithm used for address translation is illustrated. Contents of different level table offset fields are respectively translated by mapping to different level page tables, for example, level 4~level 1 page tables 110, 112, 114 and 116. In the hierarchical storage management, the storage capacity may reach 512 GB (Giga Bytes).

In one of exemplary embodiments, a fast cloning VM memory state is proposed by making use of the high level algorithm for address translation in hierarchical storage management structure. In the method of cloning VM memory state, metadata of page tables related to the highest level or higher levels is copied and the copied metadata is simultaneously shared by two virtual machines, for example, a source VM and a target VM. The target VM is the cloned virtual machine from the source VM.

In one of exemplary embodiments, the highest level (Level 4) is deployed in the method of cloning VM memory state, but not limited thereto. Higher levels such as levels 3 and 4, or levels 2~4 may be deployed for cloning VM. In the embodiment, the metadata related to a plurality of page tables in the highest level (Level 4) is copied and then set as "invalid." The time required for such cloning is almost constant. Copy-on-access (COA) and/or copy-on-write (COW) techniques are deployed for later operations. When the source VM or the target VM accesses data, the copy-on-access (COA) technique is used to replicate remaining metadata in order to implement the access operation. The copy-on-write (COW) technique is used to replicate data when the data is stored in the corresponding accessed address in the physical memory if the source VM or the target VM writes data to the storage space of the accessed address in the physical memory.

Figure 2:
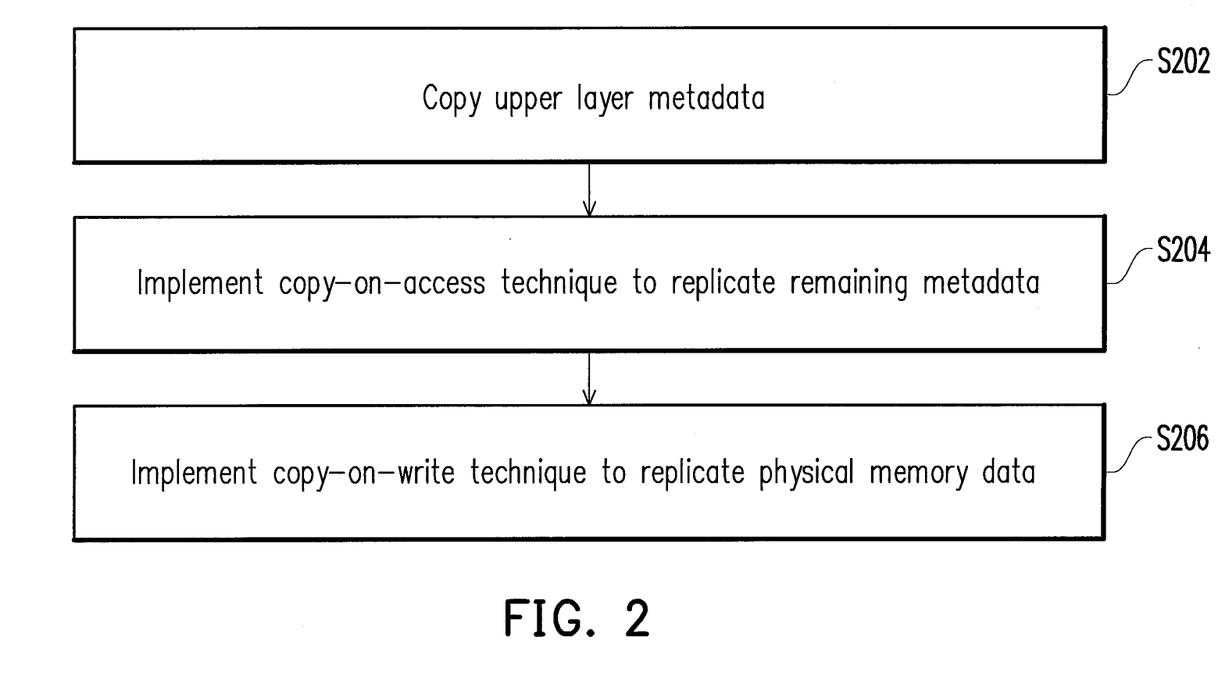
FIG. 2 schematically illustrates a flow chart illustrating a method of cloning VM memory state in one of exemplary embodiments.

Please refer to FIG. 2, which is a flow chart illustrating a method of cloning VM memory state in one of exemplary embodiments. In the exemplary embodiment, highest level is deployed for cloning, but not limited thereto. In step S202, the metadata in higher levels is copied. The mapping relationship between the guest physical address and host physical address is defined by four-level page tables. For illustration, four metadata layers L4~L1 are referred to respective metadata in different levels, for example, the metadata layer L4 represents the highest level. In step S204, the copy-on-access (COA) technique is implemented to replicate remaining metadata in response to the access operation. In step S206, the copy-on-write (COW) technique is used to replicate data stored in the corresponding address accessed in the physical memory. Aforesaid structure is like cloning on demand, in which if the VM tries to access data, an access operation is demanded, corresponding access path or paths will be established with replicating remaining metadata by COA in response to the access operation and/or with replicating data stored in the corresponding address accessed in the physical memory by COW.

Figure 3:
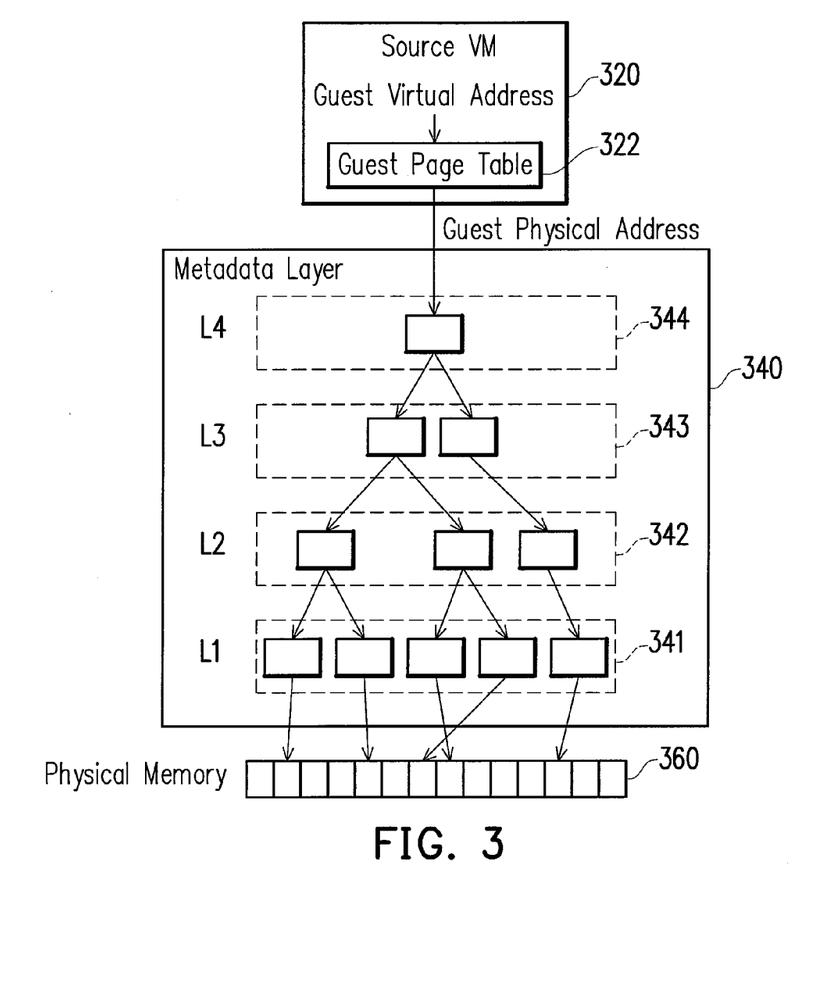
FIG. 3 schematically illustrates a relationship between a source VM and a physical memory in B-tree like memory management algorithm.

Please refer to FIG. 3, which schematically shows a relationship between a source VM and a physical memory in B-tree like memory management algorithm. The mapping relationship between the guest physical address and host physical address is defined by using four-level page tables. Four metadata layers L4~L1 are referred to respective metadata of page tables in different levels. In blocks 341, 342, 343 and 344 respectively represent the relationship of the page tables in different page table directories (PTDs). Different access paths may use to correlate the guest physical address for access and the host physical address in the physical memory. For example, in the source VM 320, a guest virtual address for access operation is mapped to a guest physical address by the guest page table 322. In response to the guest physical address, an access path is established from paths 344, 343, 342 and 341 between the guest physical address and the host physical address corresponding to pages in the physical memory 360.

Figure 4A:
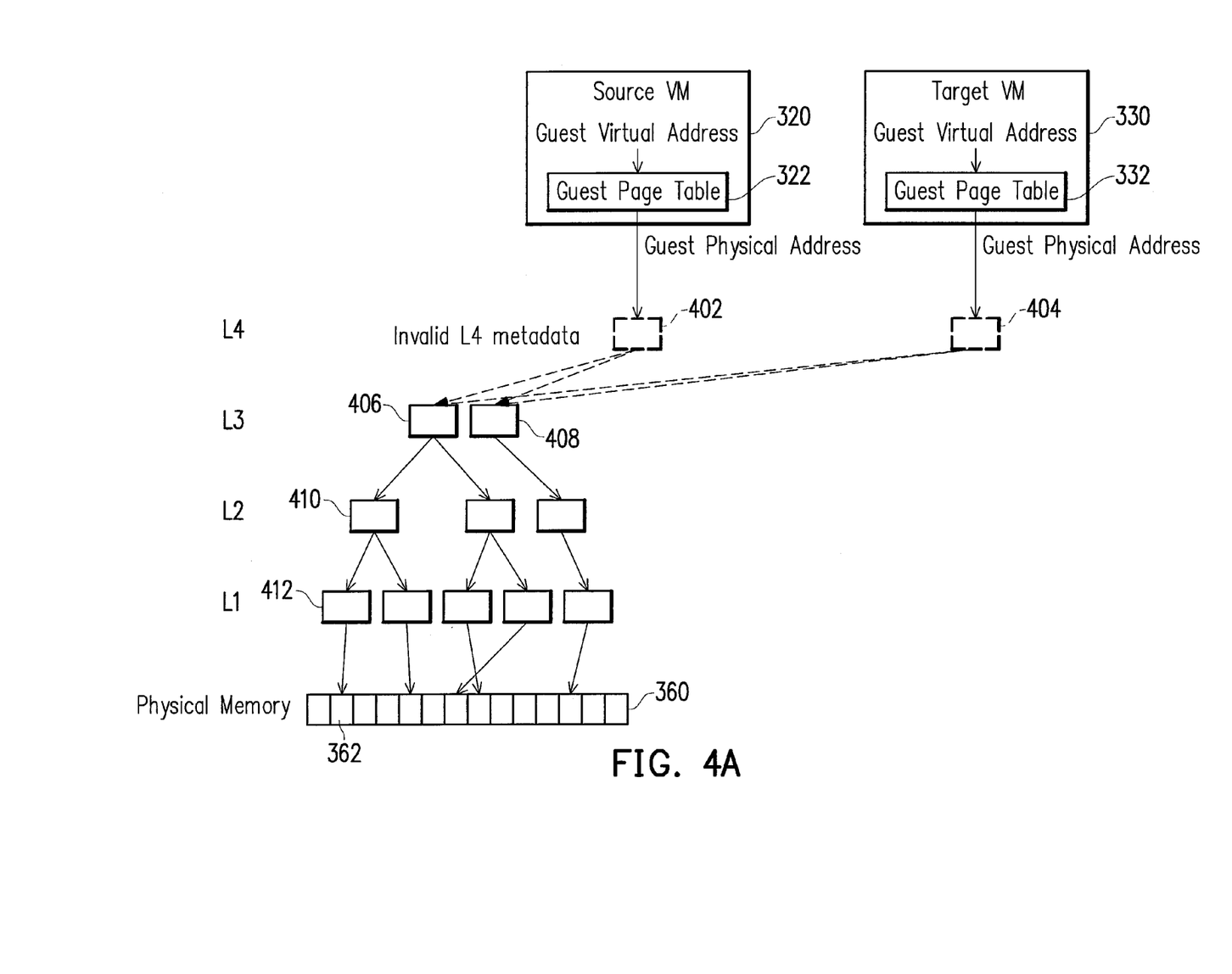
FIGS. 4A and 4B schematically illustrate a method of cloning VM memory state without a counter in one of exemplary embodiments of the disclosure.
Figure 4B:
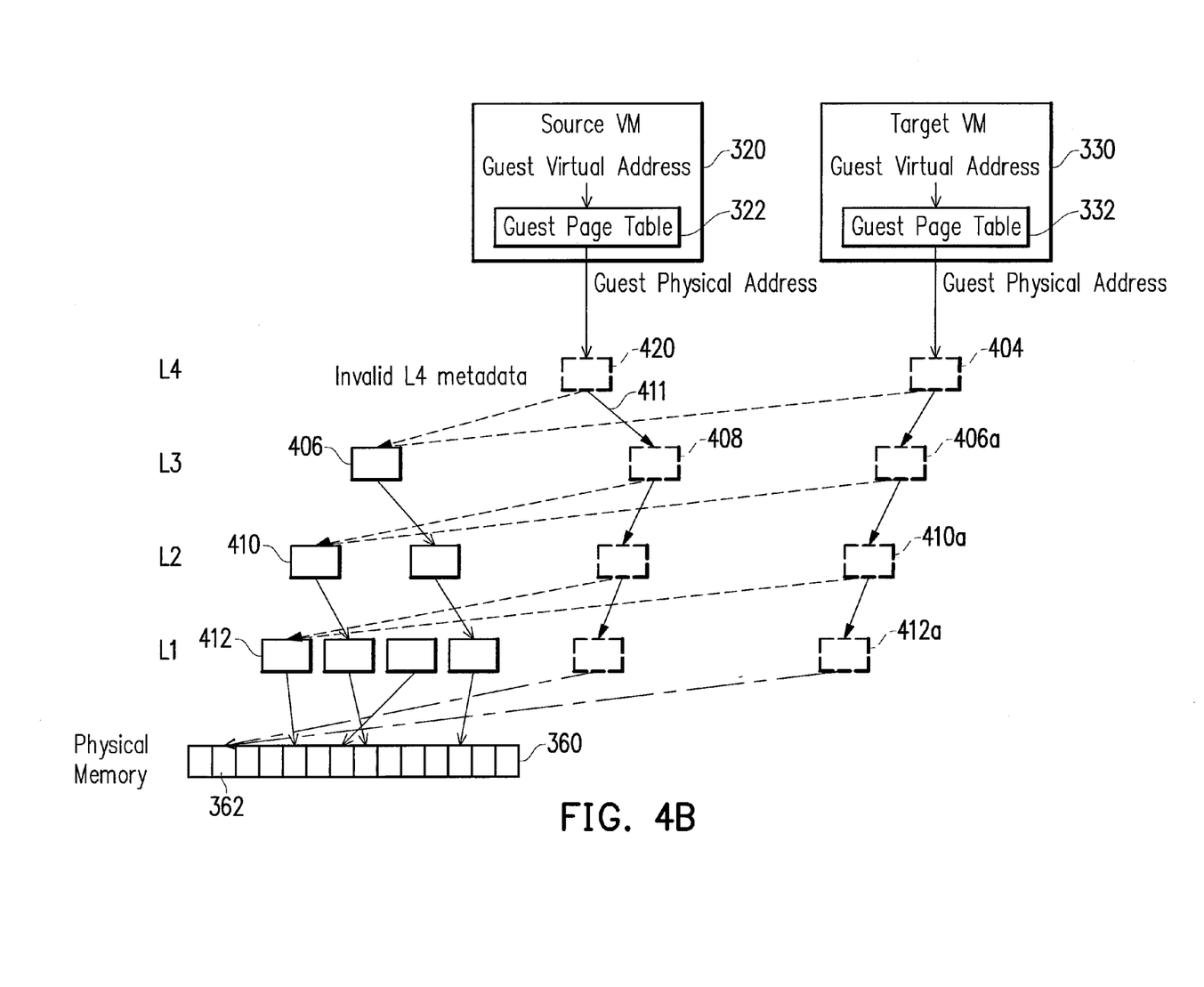

Please refer to FIGS. 4A and 4B, which illustrate a method of cloning VM memory state without a counter in one of exemplary embodiments of the disclosure. In the embodiment, if only one cloned VM is required for a source VM, it is not necessary to use a counter to record the sharing status of each of page table entries (PTEs) in page tables.

As shown in FIG. 4A, a source VM 320 is cloned and a target VM 330 is generated accordingly. The source VM 320 has a guest page table 322, and the target VM 330 also has a guest page table 332 cloned from the guest page table 322. In the exemplary embodiment, the highest level (Level 4) is deployed in the method of cloning VM memory state, but not limited thereto. Higher levels such as levels 3 and 4, or levels 2~4 may be deployed for cloning VM. In the embodiment, the metadata related to page tables in the highest level (Level 4) is copied and then set as "invalid", for example, the metadata of page table 402 of the source VM is copied and used as the metadata of the page table 404 of the target VM in the highest level (Level 4). The page table directory (PTD) in the highest level (Level 4) is set as invalid.

In the page table data structure, two page table directories correlated between the page table 402 in level 4 for the source VM 320 and the page tables 406 and 408 in the next lower level 3 are also established for the page table 404 in the target VM 330. The page table directories in the lower levels (level 3~level 1) remain unchanged, that is, metadata for the lower levels remained unchanged. If a guest virtual address will be translated to the host physical address for a page 362 in the physical memory 360, the access path will be established from a page table 406 in level 3, a page table 410 in level 2, a page table 412 in level 1 to the host physical address for the page 362 in the physical memory 360.

As shown in FIG. 4B, if a guest virtual address for access operation is mapped to a guest physical address by the guest page table 322. In response to the guest physical address, the access path is established between the guest physical address and the host physical address corresponding to a page 362 in the physical memory 360. According to the access path, the page tables related to the PTD along the access path in the higher levels will first be recovered on demand. That is, a page table 406a in level 3, a page table 410a in level 2, a page table 412a in level 1 is recovered. The other page tables not related to the access path remains the status "invalid." According to the access path to the page 362 of the physical memory 360, flags for the page table entries (PTEs) accessed in the page tables 412a are marked as read only, which is ready for copy-on-write (COW) operation. Copy-on-write (COW) technique is used to replicate data stored in the corresponding address accessed in the page 362 in the physical memory 360 if write operation is required.

Figure 5A:
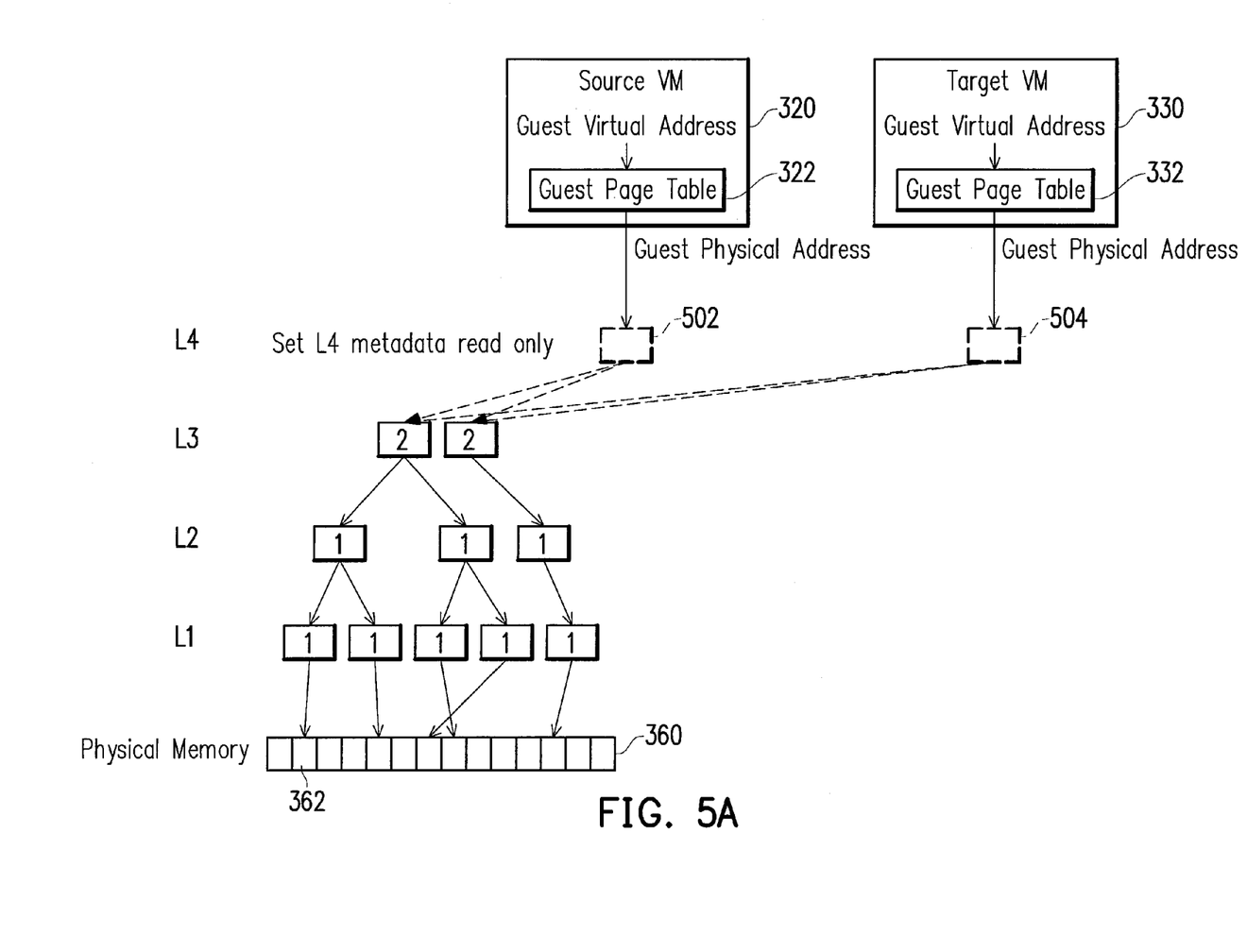
FIGS. 5A and 5B schematically illustrate a method of cloning VM memory state with a counter in one of exemplary embodiments of the disclosure.
Figure 5B:
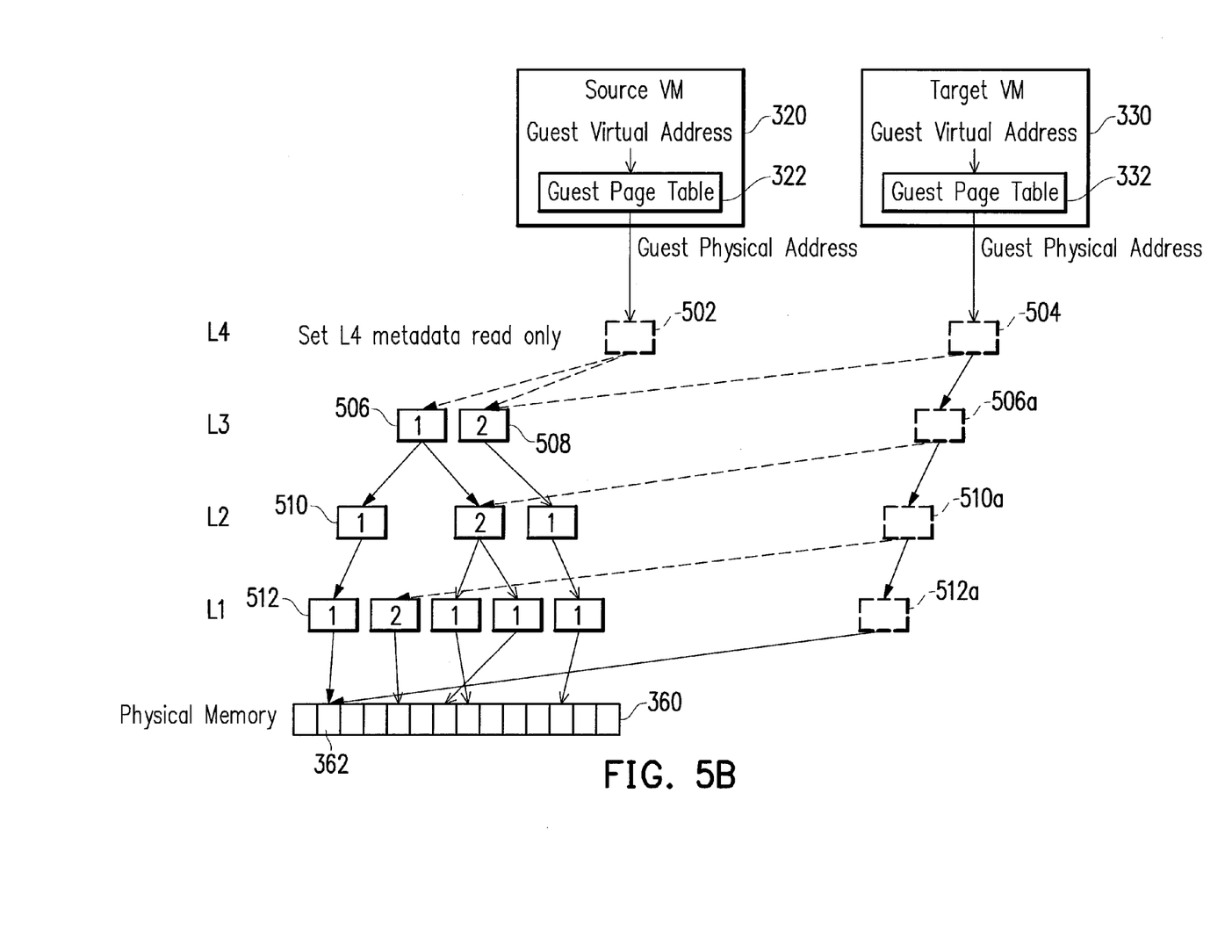

Please refer to FIGS. 5A and 5B, which illustrate a method of cloning VM memory state with a counter in one of exemplary embodiments of the disclosure. The same numbers in FIG. 4A and FIG. 4B are used for the same elements or structures.

As shown in FIG. 5A, a source VM 320 is cloned and a target VM 330 is generated accordingly. The source VM 320 has a guest page table 322, and the target VM 330 also has a guest page table 332 cloned from the guest page table 322. In the exemplary embodiment, the highest level (Level 4) is deployed in the method of cloning VM memory state, but not limited thereto. Higher levels such as levels 3 and 4, or levels 2~4 may be deployed for cloning VM. In the embodiment, the metadata in the highest level (Level 4) is copied and then set as "read only." The page table directory (PTD) in the highest level (Level 4) is set as "read only."

The counter is used for counting the sharing status of each of page tables in different levels. If the number corresponding to one page table is "1", it means that only one link or one path is established to the page table. It is not necessary to copy the page table unless write operation is performed (copy-on-Write, COW). If two or more links or paths are established to the page table, the number corresponding to the page table will be more than "1" in next write operation, which means that copy operation is necessary if next write operation is performed to the page table.

If a page is written by the source VM 320 or by the target VM, the number of the counter for the page tables corresponding to the access path will be plus one and becomes "2", for example. The page table will be copied in the write operation and a new page table will be established to recover the page table on demand. In the page table data structure, two page table directories correlated between the page table 502 in level 4 for the source VM 320 and the page tables 506 and 508 in the next lower level 3 are also established for the page table 504 in the target VM 330. The page table directories in the lower levels (level 3~level 1) remain unchanged, that is, metadata for the lower levels remained unchanged. In next write operation to the page 362 in the physical memory 360, the number in the counter for the page table 506 becomes "2." As shown in FIG. 5B, the access path is established from a page table 506 in level 3, a page table 510 in level 2, a page table 512 in level 1 to the host physical address for the page 362 in the physical memory 360. The page tables 506, 510 and 512 along the access path are recovered. The other page tables not related to the access path remains the status "read only." According to the access path to the page 362 of the physical memory 360, flags for the page table entries (PTEs) accessed in the page tables 504, 506a, 510a and 512a along the access path are marked as read only, which is ready for copy-on-write (COW) operation.

The number "1" and "2" in the FIG. 5A and FIG. 5B are used just for explanation of the share status of each of the page tables. The counter may be configured in the page table data structure, or in other place. For example, in extended page tables (EPT) structure of Intel® VT-x technology, some reserved bits may be used for the counter. If the counter is established in other place, a hash table may be used to correlate to each of the page tables. In some other embodiments, the whole page table may be unshared.

Figure 6A:
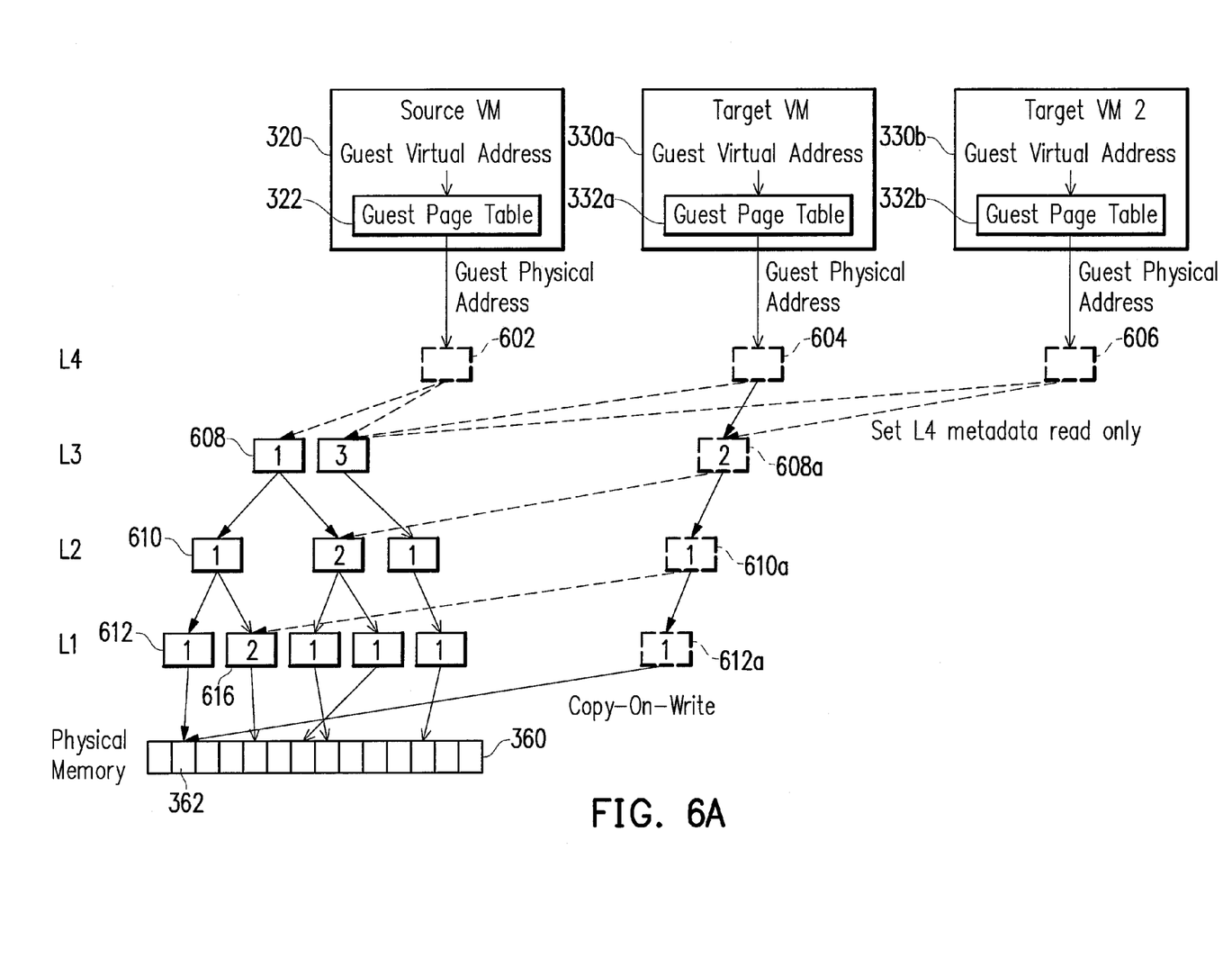
FIGS. 6A and 6B schematically illustrate a method of cloning VM memory state for virtual machines with a counter in one of exemplary embodiments of the disclosure.
Figure 6B:
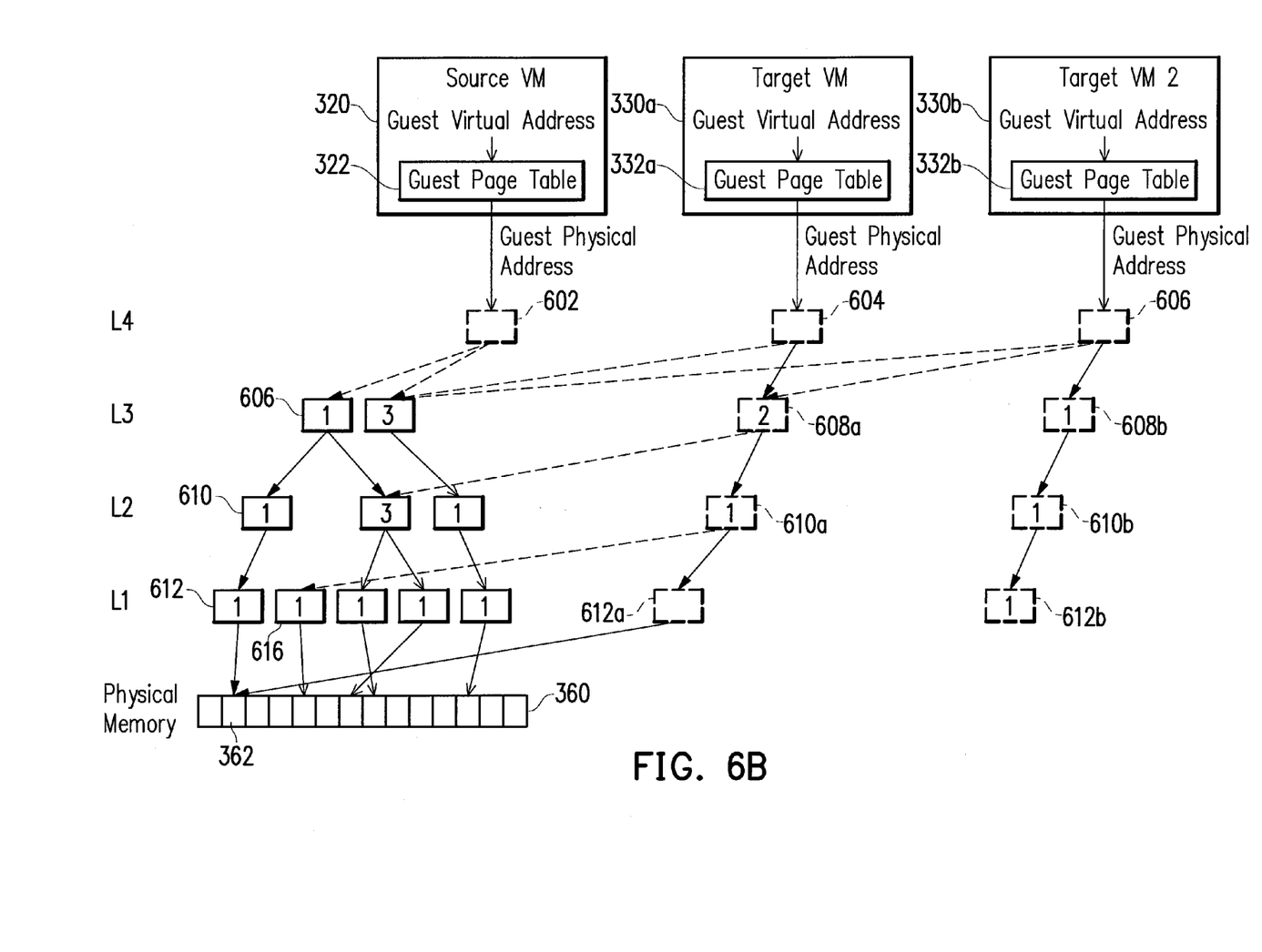

In a case of cloning a plurality of virtual machines, please refer to FIGS. 6A and 6B, which illustrate a method of cloning VM memory state for virtual machines with a counter in one of exemplary embodiments of the disclosure.

As shown in FIG. 6A, a source VM 320 is cloned and a first target VM 330a and a second target VM 330b are generated accordingly. The source VM 320 has a guest page table 322, and the first and second target VMs 330a and 330b also have their respective guest page tables 332a and 332b cloned from the guest page table 322. In the exemplary embodiment, the highest level (Level 4) is deployed in the method of cloning VM memory state, but not limited thereto. Higher levels such as levels 3 and 4, or levels 2-4 may be deployed for cloning VM. In the embodiment, the metadata in the highest level (Level 4) is copied and then set as "read only."

The counter is used for counting the sharing status of each of page tables in different levels, as illustrated in FIG. 5A and FIG. 5B. If a page is written by the first target VM 330a, the page table will be copied in the write operation and a new page table will be established to recover the page table on demand. As shown in FIG. 6A, if the first target VM 330a accesses the page 362 in the physical memory 360, the access path is established from a page table 608 in level 3, a page table 610 in level 2, a page table 612 in level 1 to the host physical address for the page 362 in the physical memory 360. The page tables 606, 610 and 612 along the access path are recovered. The other page tables not related to the access path remains the status "read only." According to the access path to the page 362 of the physical memory 360, flags for the page table entries (PTEs) accessed in the page tables 604, 608a, 610a and 612a along the access path are marked as read only, which is ready for copy-on-write (COW) operation.

In further case that, as shown in FIG. 6B, if the second target VM 330b accesses the page 362 in the physical memory 360, another access path is established from the page table 606 in level 1, the page table 608a in level 3, the page table 610a in level 2, the page table 612a in level 1 to the host physical address for the page 362 in the physical memory 360. The page tables 608a, 610a and 612a along the access path are recovered respectively to page tables 608b, 610b and 612b. The other page tables not related to the access path remains the status "invalid." According to the access path to the page 362 of the physical memory 360, flags for the page table entries (PTEs) accessed in the page tables 604, 608b, 610b and 612b along the access path are marked as read only, which is ready for copy-on-write (COW) operation.

The disclosure provides a fast cloning method of data stored in a memory of a virtual machine (VM). One of exemplary embodiments comprises providing a method of cloning metadata by copy-on-access (COA) and cloning data by copy-on-write (COW) for rapid cloning VM. In one of exemplary embodiments, when the VM desires to accesses data, the copy-on-access (COA) technique is used to replicate remaining metadata in order to implement the access operation. The copy-on-write (COW) technique is used to replicate data stored in the corresponding address accessed in the physical memory if the source VM or the target VM writes data to the physical memory.

The fast cloning method of data stored in a memory of a virtual machine (VM) may be applied to different virtualization structures, such as AMD-Virtualization™ (AMD-V™) and Intel® VT-x technologies. In Intel® VT-x technology, Extended Page Tables (EPT) structure is proposed. In the AMD-Virtualization™ (AMD-V™) technology, nested paging structure is proposed. The Extended Page Table (EPT) is an Intel second generation x86 virtualization technology for the memory management unit (MMU). When the feature is active, the ordinary IA-32 page tables (referenced by control register CR3) translate from linear addresses to guest-physical addresses. A separate set of page tables (the EPT tables) translate from guest-physical addresses to the host-physical addresses that are used to access memory. As a result, guest software can be allowed to modify its own IA-32 page tables and directly handle page faults. This allows a virtual machine monitor (VMM) to avoid the VM exits associated with page-table virtualization, which are a major source of virtualization overhead without EPT.

In the exemplary embodiments of the fast cloning methods of data stored in a memory of a virtual machine (VM) set forth above, or other embodiments, the methods of cloning metadata by copy-on-access (COA) and cloning data by copy-on-write (COW) for rapid cloning VM may be implemented by a computer system. The computer system comprises a host. The host may comprise a bus system, a memory module and a processing unit. The memory module connects to the bus system and includes a set of computer executable instructions. The processing unit is connected to the bus system. The processing unit executes the set of computer executable instructions for embodying the methods above.

Aspects of the disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, aspects of the disclosure may take the form of a computer program product accessible from a computer-usable or computer-readable medium providing program code for use by or in connection with a computer or any instruction execution system.

For the purposes of this description, a computer-usable or computer readable medium may be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of cloning data in a memory for a source virtual machine (VM) and at least one cloned virtual machine, wherein the source virtual machine and the at least one cloned virtual machine are system virtual machines, wherein a mapping relationship between a guest physical address from the source VM or the at least one cloned VM and a host physical address of the memory is defined by a plurality of page tables configured in a plurality of hierarchical levels, the method comprising:
copying metadata of the page tables in a highest level or higher levels of the plurality of hierarchical levels of the source VM to the at least one cloned virtual machine;
setting the metadata of the page tables in the highest level or the higher levels of the plurality of hierarchical levels of the source VM invalid;
copying remaining metadata of the page tables in levels other than the metadata of the page tables in the highest level or the higher levels of the plurality of hierarchical levels of the source VM to the at least one cloned virtual machine in response to an access operation;
accessing data stored in corresponding address of the memory according to the copied metadata of the page tables in the highest level or higher levels and the copied metadata of the page tables in the levels other than the metadata of the page tables in the highest level or the higher levels; and writing data to the corresponding address of the memory by copy-on-write (COW) technique for isolated protection and/or independent execution between the source VM and the at least one cloned VM, wherein before writing data to the corresponding address of the memory by copy-on-write (COW) technique, a lowest level of the copied metadata of the page tables in the levels other than the metadata of the page tables in the highest level or the higher levels are set to be read only.

2. The method of cloning data in a memory for a virtual machine as claimed in claim 1, wherein after copying metadata of the page tables in the highest level or the higher levels of the plurality of hierarchical levels of the source VM to the cloned virtual machine, further comprising:

setting a plurality of page table directories corresponding to the highest level or the higher levels of the plurality of hierarchical levels invalid.

3. The method of cloning data in a memory for a virtual machine as claimed in claim 1, wherein copying remaining metadata of the page tables in the levels other than the metadata of the page tables in the highest level or the higher levels of the plurality of hierarchical levels of the source VM to the cloned virtual machine in response to the access operation comprising recovering the page tables on demand in the levels other than the highest level or the higher levels of the plurality of hierarchical levels in response to the access operation.

4. The method of cloning data in a memory for a virtual machine as claimed in claim 1, wherein accessing data stored in the corresponding address of the memory comprising establishing one or more access paths according to the copied metadata of the page tables in the levels other than the metadata of the page tables in the highest level or the higher levels to accessing the data stored in the corresponding address of the memory according to the copied metadata of the page tables in the highest level or higher levels and the copied metadata of the page tables in the levels other than the metadata of the page tables in the highest level or the higher levels.

5. The method of cloning data in a memory for a virtual machine as claimed in claim 1, wherein the number of the plurality of hierarchical levels is four.

6. The method of cloning data in a memory for a virtual machine as claimed in claim 1, wherein the guest physical address is compatible with an extended page tables (EPT) structure, and the plurality of page tables configured in the plurality of hierarchical levels for translating the guest physical address.

7. The method of cloning data in a memory for a virtual machine as claimed in claim 1, wherein the guest physical address is compatible with a nested paging structure, and the plurality of page tables configured in the plurality of hierarchical levels for translating the guest physical address.

8. The method of cloning data in a memory for a virtual machine as claimed in claim 1, wherein before copying remaining metadata of the page tables in the levels other than the metadata of the page tables in the highest level or the higher levels of the plurality of hierarchical levels of the source VM, counting a share status of each of the page tables configured in the levels other than the highest level or the higher levels of the plurality of hierarchical levels, and copying remaining metadata of the page tables according to a result of the counting.

9. The method of cloning data in a memory for a virtual machine as claimed in claim 8, wherein the result of the counting for each of the page tables is stored in its corresponding page table.

10. The method of cloning data in a memory for a virtual machine as claimed in claim 8, wherein the result of the counting for each of the page tables is stored in a hash table.

11. A product of computer programs stored in a non-transitory computer accessible medium, which comprises a set of computer readable programs for embodying the method as claimed in claim 1 in one or more computer systems.

12. A computer system, which comprises:
a host, which comprises:
a bus system;
a memory module connecting to the bus system, wherein a set of computer executable instructions is included; and
a processing unit connecting to the bus system, where the processing unit executes the set of computer executable instructions for embodying the method as claimed in claim 1.

13. A method of cloning data in a memory for a source virtual machine (VM) and at least one cloned virtual machine, wherein the source virtual machine and the at least one cloned virtual machine are system virtual machines, wherein a mapping relationship between a guest physical address from the source VM or the at least one cloned VM and a host physical address of the memory is defined by a plurality of page tables configured in a plurality of hierarchical levels, the method comprising:

copying metadata of the page tables in the highest level of the plurality of hierarchical levels of the source VM to the at least one cloned virtual machine;

setting the metadata of the page tables in the highest level of the plurality of hierarchical levels of the source VM invalid;

copying remaining metadata of the page tables in levels other than the metadata of the page tables in the highest level of the plurality of hierarchical levels of the source VM to the at least one cloned virtual machine in response to an access operation;

accessing data stored in corresponding address of the memory according to the copied metadata of the page tables in the highest level and the copied metadata of the page tables in the levels other than the metadata of the page tables in the highest level; and writing data to the corresponding address of the memory by copy-on-write (COW) technique for isolated protection and/or independent execution between the source VM and the at least one cloned VM, wherein before writing data to the corresponding address of the memory by copy-on-write (COW) technique, a lowest level of the copied metadata of the page tables in the levels other than the metadata of the page tables in the highest level are set to be read only.

14. The method of cloning data in a memory for a virtual machine as claimed in claim 13, wherein after copying metadata of the page tables in the highest level of the plurality of hierarchical levels of the source VM to the cloned virtual machine, further comprising:

setting a plurality of page table directories corresponding to the highest level of the plurality of hierarchical levels invalid.

15. The method of cloning data in a memory for a virtual machine as claimed in claim 13, wherein copying remaining metadata of the page tables in the levels other than the metadata of the page tables in the highest level of the plurality of hierarchical levels of the source VM to the cloned virtual machine in response to the access operation comprising
  recovering the page tables on demand in the levels other than the highest level of the plurality of hierarchical levels in response to the access operation.

16. The method of cloning data in a memory for a virtual machine as claimed in claim 13, wherein accessing data stored in the corresponding address of the memory comprising
  establishing one or more access paths according to the copied metadata of the page tables in the levels other than the metadata of the page tables in the highest level to accessing the data stored in the corresponding address of the memory according to the copied metadata of the page tables in the highest level and the copied metadata of the page tables in the levels other than the metadata of the page tables in the highest level.

17. The method of cloning data in a memory for a virtual machine as claimed in claim 13, wherein the number of the plurality of hierarchical levels is four.

18. The method of cloning data in a memory for a virtual machine as claimed in claim 13, wherein the guest physical address is compatible with an extended page tables (EPT) structure, and the plurality of page tables configured in the plurality of hierarchical levels for translating the guest physical address.

19. The method of cloning data in a memory for a virtual machine as claimed in claim 13, wherein the guest physical address is compatible with an nested paging structure, and the plurality of page tables configured in the plurality of hierarchical levels for translating the guest physical address.

20. The method of cloning data in a memory for a virtual machine as claimed in claim 13, wherein before copying remaining metadata of the page tables in the levels other than the metadata of the page tables in the highest level of the plurality of hierarchical levels of the source VM, counting a share status of each of the page tables configured in the levels other than the highest level of the plurality of hierarchical levels, and copying remaining metadata of the page tables according to a result of the counting.

21. The method of cloning data in a memory for a virtual machine as claimed in claim 20, wherein the result of the counting for each of the page tables is stored in its corresponding page table.

22. The method of cloning data in a memory for a virtual machine as claimed in claim 20, wherein the result of the counting for each of the page tables is stored in a hash table.

23. A product of computer programs stored in a non-transitory computer accessible medium, which comprises a set of computer readable programs for embodying the method as claimed in claim 13 in one or more computer systems.

24. A computer system, which comprises:
  a host, which comprises:
  a bus system;
  a memory module connecting to the bus system, wherein a set of computer executable instructions is included; and
  a processing unit connecting to the bus system, where the processing unit executes the set of computer executable instructions for embodying the method as claimed in claim 13.

* * * * *